United States Patent Office 3,761,432
Patented Sept. 25, 1973

3,761,432
METHOD FOR THE PRODUCTION OF ALUMINUM COATINGS
Peter Fritsche, Hiltrup, Germany, assignor to Glasurit-Werke M. Winkelmann GmbH, Hamburg-Wandsbek, Germany
No Drawing. Filed June 3, 1971, Ser. No. 149,751
Claims priority, application Germany, June 4, 1970, P 20 27 427.5
Int. Cl. C08g 5/20
U.S. Cl. 260—19         7 Claims

ABSTRACT OF THE DISCLOSURE

Improved film-forming organic resin paint aqueous binder replenishment concentrated composition adapted for dispersing in an aqueous electrocoating bath containing suspended aluminum powder and sufficient additional water-soluble amino compound to impart anionic polyelectrolyte behavior in said bath to resin in said binder concentrate composition, said binder concentrate composition comprising:

(I) about 10–50 percent weight of a non-heat reactive phenol-aldehyde resin; and
(II) about 50–90 percent by weight of a copolymer, said copolymer comprising:

(A) about 50–85 percent by weight of an ester of methacrylic acid or acrylic acid with an alcohol having 1–10 carbon atoms;
  (B) about 5–20 percent by weight of drying oils or drying oil fatty acids containing olefinically unsaturated fatty acids;
  (C) about 5–15 percent by weight of an α,β-olefinically unsaturated carboxylic acid having 3–5 carbon atoms;
  (D) about 3–20 percent by weight of methacrylamide, acrylamide, methylol methacrylamide, methylol acrylamide, an ether of methylol methacrylamide with an alcohol having 1–8 carbon atoms, an ether of methylol acrylamide having 1–8 carbon atoms or a mixture thereof; and optionally
  (E) up to 20 percent by weight of further copolymerizable olefinically unsaturated compounds.

CROSS-REFERENCE TO RELATED APPLICATIONS

Applicant claims priority under 35 U.S.C. 119 for application P 20, 27, 427.5, filed June 4, 1970 in the Patent Office of the Federal Republic of Germany. Applicant incorporates by reference the disclosure of his copending application entitled "Method for the Production of Coatings," K&W 353, filed in the U.S. Patent Office on the same date as the present application.

BACKGROUND OF THE INVENTION

The field of the invention is synthetic resins with fat, fatty oil, fatty oil acid or salt thereof. The present invention is particularly concerned with the production of aluminum coatings of metallic luster on metallic surfaces by electrodeposition from aqueous aluminum suspensions.

The state of the prior art of electrophoretic deposition of coatings from aqueous suspension may be ascertained by reference to U.S. Pats. 2,470,752 of Bobalek, dated May 24, 1949; 2,992,197 of Boller, dated July 11, 1961; 3,230,-162 of Gilchrist, dated Jan. 18, 1966; 3,297,557 of Huggard, dated Jan. 10, 1967; and 3,404,110 of Hunt, dated Oct. 1, 1968; and Kirk-Othmer "Encyclopedia of Chemical Technology," 1st ed., vol. 5 (1950), under the section "Electrophoretic Deposition," pages 606–610, and vol. 8, 2nd ed. (1965) under the section "Electrophoretic Deposition," pages 23–26. The disclosures of all of these references are incorporated herein. The preparation of the aluminum powder used in the present invention is disclosed in the Kirk-Othmer "Encyclopedia of Chemical Technology," 2nd ed., vol. 1 (1963), pages 986–987, and vol. 15 (1968), pages 546–548. The preparation, designation and use of the cyclized rubber used in the present invention is disclosed in Kirk-Othmer, 2nd ed., vol. 17 (1968), pages 651–655.

U.S. Pat. 2,470,752 of Bobalek discloses an ungelled resinous interpolymer of a monovinyl aromatic compound, a monocarboxylic olefinic acid, a drying oil or drying oil fatty acid, a polyhydric alcohol and a polybasic organic acid.

The Boller pat. 2,992,197 discloses an aqueous system comprising water-soluble salts of long chain fatty acid ester polymers formed from drying oil, semi-drying oil, polyhydroxy alcohol, long chain fatty esters and cyclopentadiene derivatives of long chain fatty acid materials modified by a dicarboxylic acid, alkyl modified dicarboxylic acid, dicarboxylic acid anhydride and mixtures thereof.

Gilchrist 3,230,612 discloses improvements in electrocoating from an aqueous film-forming paint binder containing polycarboxylic acid resin which is partially neutralized with a water-soluble amino compound. The patent of Gilchrist includes a disclosing of blending polycarboxylic acid resins with thermoplastic, non-heat reactive phenolic resins, the use of film plasticizers such as amino aldehyde resins, butadiene-syrene latices, vinyl chloride and vinylidene chloride polymer latices and other olefinically unsaturated compounds and the preparation of the polycarboxylic acid resins.

U.S. Pat. 3,297,557 of Huggard discloses the electrophoretic deposition of organic resinous coatings from aqueous emulsion systems containing a salt of a base with a heat reaction product of α,β-ethylenically unsaturated carboxylic acid with a polyester of an unsaturated fatty acid and an aliphatic polyhydric alcohol.

Hunt 3,404,110 discloses an addition copolymer for use in aqueous dispersions having an α,β-ethylenically unsaturated carboxylic acid, and a drying oil fatty acid or an adduct of the drying oil fatty acid with an acyclic α-unsaturated olefinic polycarboxylic acid or anhydride.

It is conventional to produce aluminum coatings by vaporizing aluminum under a high vacuum and coating the article in this manner. However, these coatings are very sensitive and must additionally be protected by a clear varnish. Aluminum coatings have been produced by applying aluminum bronze varnishes to the article to be treated by painting or spraying. Such varnish coatings can be of the air-dried or baked types. Useful aluminum coatings can be obtained from aqueous media only with difficulty, because the aluminum particles lose their buoyant effect, so that the film does not retain its metallic lustrous appearance. Besides, numerous synthetic resin dispersions are sensitive to metallic ions and coagulate. Furthermore, when the binder is adjusted too much toward the acidic or alkaline range, the aluminum becomes gray and hydrogen is evolved.

SUMMARY OF THE INVENTION

Having in mind the prior art, it has now been found surprisingly that it is possible to produce, by means of an electrophoretic process, metallically lustrous aluminum coatings on metallic surfaces from aqueous aluminum suspensions. The conventional disadvantages are avoided by depositing from a slurry of finely divided aluminum particles in an aqueous solution or dispersion of a synthetic resin mixture neutralized at least partially by inorganic alkalies or ammonia and/or organic water-soluble amines.

This synthetic resin mixture comprises:

(I) about 10–50 percent by weight of at least one conventional phenolic resin, and (II) about 50–90 percent by weight of a copolymer of:
- (A) about 50–85 percent by weight of at least one ester of acrylic or methacrylic acid with an alcohol having 1–10 carbon atoms,
- (B) about 5–20 percent by weight of at least one drying oil or drying oil acid containing olefinically unsaturated fatty acids,
- (C) about 5–15 percent by weight of at least one copolymerizable α,β-olefinically unsaturated carboxylic acid having 3–5 carbon atoms,
- (D) about 2–20 percent by weight of acrylamide, methacrylamide, methylol acrylamide, methylol methacrylamide, an ether of methylol acrylamide with an alcohol having 1–8 carbon atoms, or an ether of methylol methacrylamide with an alcohol having 1–8 carbon atoms, and optionally
- (E) up to 20 percent by weight of further copolymerizable olefinically unsaturated compounds.

The aluminum is deposited electrophoretically on metallic surfaces such as steel, aluminum, copper, etc., connected as the anode, and the coating is cured.

Preferably, coatings are obtained in this manner which contain about 15–25 percent by weight of aluminum and about 75–85 percent by weight of the synthetic resin mixture of I and II.

The aluminum dispersed in the suspension used according to this invention is the so-called "leaf" type and is in the form of leaves. The preferred size of the leaves is between 10 and 75 microns. However, minor proportions of a particle size of less than 10 microns and more than 75 microns are likewise possible. The preparation of this aluminum powder is disclosed in the Kirk-Othmer "Encyclopedia of Chemical Technology," 2nd ed., vol. 15 (1968), pp. 546–548.

The synthetic resin mixture of components I and II produces an extraordinarily good buoyant effect on the aluminum, so that the coating obtains its bright and metallic appearance. This synthetic resin mixture surprisingly retards the graying of the suspended aluminum and the electrocoating bath therefore remains operable until it is exhausted. This widens the spectrum of applications for the electrophoretic deposition process, and the advantageous properties of the electrocoating procedure can also be used in the production of the coatings of this invention. The advantages of the electrodeposition process reside in that the coating of the electrically conductive object in the electrocoating bath does not only occur on the side facing the counter electrode, but also on the side facing away from the counter electrode, for example in the interior of hollow bodies. In the art of electrophoretic coating, this is called throwing power. By the electrophoretic production of an aluminum coating, a throwing power is thus achieved which cannot be obtained in a single operating step in the conventional manner, by dipping, spraying or painting of a conventional aluminum bronze paint.

The aluminum suspension employed according to this invention is distinguished, in addition to high throwing power, especially by voltage insensitivity and bath stability. The coatings produced thereby exhibit good flow characteristics and a very advantageous hardness/impact strength ratio. They have a metallic lustrous appearance.

DESCRIPTION OF THE PREFERRED EMBODIMENTS

The synthetic resin mixture of the aluminum suspension consists of a component I and a component II. Suitable as component I are the conventional phenolic resins, i.e., the condensation products of phenols and formaldhyde, ordinarily produced from phenols and substituted phenols, such as, for example, phenol, cresol, xylenol, 2,2-bis(p-hydroxyphenyl) propane, and aqueous formaldehyde solution, in the presence of customary basic catalytic agents, such as, for example, ammonia or water-soluble amines (see, for example, K. Hultzsch "Chemie der Phenolharze" [Chemistry of Phenolic Resins], Springer publishers, 1950, p. 118). The phenolic resin is contained in the synthetic resin mixture of this invention in an amount of about 10–50 percent by weight, preferably 20–35 percent by weight.

The copolymer II of the synthetic resin mixture of the present invention contains, as component (A), 50–85 percent by weight, preferably 50–70 percent by weight of at least one ester of acrylic acid or methacrylic acid with alcohols having 1–10 carbon atoms, polymerized into this copolymer. Suitable esters of acrylic acid or methacrylic acid are those with straight chain, branched, or cyclic alcohols, such as, for instance, methanol, ethanol, propanol, n-butanol, isobutanol, tert.-butanol, amyl alcohol, hexyl alcohol, cyclohexanol, heptanol, octanol, 2-ethylhexanol, nonanol, and decanol, as well as mixtures of these esters. Particularly suitable are the esters of acrylic acid with n-butanol, isobutanol, as well as methyl methacrylate, or mixtures of these esters.

As component (B), the copolymer II contains, according to this invention, about 5–20 percent by weight, preferably 7–15 percent by weight of at least one drying oil or drying oil fatty acid containing olefinically unsaturated fatty acids, polymerized into this copolymer. Preferably suitable are drying oils or drying oil fatty acids containing at least partially conjugated double bonds, or which form conjugated double bonds at 100–200° C. Suitable oils in this connection are soybean oil, linseed oil and preferably isomerized linseed oil; tall oil and tall oil distillates, such as, for example, the so-called intermediate fraction, which distillates consist of a fatty acid/rosin acid mixture with about 25–30 percent by weight of rosin acid; dehydrated castor oil, as well as castor oil. The content of conjugated double bonds in these unsaturated oils can be determined, for example, according to Kaufmann and Baldes, "Berichte der Deutschen Chemischen Gesellschaft" [Reports of the German Chemical Society], 70th year, p. 903 (1937), by ascertaining the diene number. The unsaturated oils to be preferably employed according to this invention generally exhibit a diene number of more than 5, preferably more than 10. The ricinoleic acid contained in the castor oil can be converted, by splitting off water, into a fatty acid containing two conjugated double bonds.

In addition to the two double bonds in conjugated position with respect to each other, still further isolated double bonds can be present in the unsaturated oils preferably employed. Particularly suitable for the coating compositions of this invention proved to be isomerized linseed oil having a diene number of 10–30 and/or tall oil having a diene number of 10–15.

The copolymer II contains, as component (C), about 5–15 percent by weight of at least one copolymerizable α,β-olefinically unsaturated carboxylic acid having 3–5 carbon atoms. In addition to itaconic acid, citraconic acid, mesaconic acid, and maleic acid, the monoesters thereof, or maleic anhydride, preferably suitable are acrylic acid and methacrylic acid.

As component (D), the copolymer II contains about 3–20, preferably 5–15 percent by weight of acrylamide, methacrylamide, methylol acrylamide, methylol methacrylamide, an ether of methylol acrylamide with alcohols having 1–8 carbon atoms or an ether of methylol methacrylamide with alcohols having 1–8 carbon atoms, such as, for example, N-butoxymethylmethacrylic acid amide, polymerized into this copolymer.

Optionally, copymer II can contain, as component (E), up to 20 percent by weight of further copolymerizable, olefinically unsaturated compounds, polymerized into this copolymer. Suitable substances are the conventional copolymerizable vinyl compounds, such as vinyl esters, e.g. vinyl pivalate, vinyl "Versatic" esters [TM of Shell Chemical Co. for a saturated synthetic tertiary monocarboxylic acid, chain length $C_9$–$C_{19}$], and especially vinyl aromatics, such as, e.g., styrene, vinyltoluene, p-chlorostyrene, as well as acrylonitrile or methacrylonitrile, along with copolymerizable compounds containing several double bonds, such as, for example, butadiene or isoprene.

Preferred copolymers II contain, for example, 50–60 percent by weight of isobutyl acrylate or n-butyl acrylate, and 10–20 percent by weight of methyl methacrylate, or 60–70 percent by weight of n-butyl acrylate as component (A); 7–15 percent by weight of isomerized linseed oil (diene number 20–30) or distilled tall oil "intermediate fraction" or caster oil as component (B); 7–12 percent by weight of acrylic acid as component (C); and 5–15 percent by weight of acrylamide or methacrylamide as component (D), polymerized into these preferred copolymers.

The copolymer II is produced from the individual components generally in accordance with the conventional methods, suitably according to the solution polymerization process, i.e. the polymerization is conducted in solvents wherein the monomers as well as the polymerized products are soluble. Suitable solvents are, for example, alcohols, ethers and/or ketones, or mixtures of these solvents. The boiling point of these suitable solvents or solvent mixtures ranges advantageously from about 50° C. to 120° C. For producing the copolymer II, the ordinary, radical-forming polymerization initiators are useful, such as organic peroxides, e.g. benzoyl peroxide, cyclohexanone peroxide, dli-tert.-butyl peroxide, organic hydroperoxides, e.g. cumene hydroperoxide, as well as aliphatic azo compounds, such as, for example, azobisisobutyronitrile. These polymerization initiators are suitably employed in amounts of from 0.5 to 5 percent by weight, based on the total monomers. The monomers to be polymerized are generally contained in the above-mentioned solvents or solvent mixtures in a quantity of about 50–75 percent by weight. The solution polymerization is suitably conducted at temperatures in the range of the boiling temperatures of the solutions, in order to be able to remove the heat of reaction by distillation cooling. The monomer solution containing the initiator can be made to polymerize in its entirety; however, it is more advantageous to start the polymerization at first with only a part of the solution of monomers, or only to provide the solvent and to add the mixture of monomers or the remainder of the solution of monomers gradually, so that the heat of reaction occurring during the polymerization is controlled more readily. In many cases, it is advantageous to conduct the polymerization in the presence of small amounts of conventional regulators. Suitable regulators are, for example, n- or tert.-dodecyl mercaptan, diisopropyl xanthogen disulfide. These regulators are generally employed in amounts of 0.5–3 perrent by weight, based on the total monomers. Copolymer II exhibits, in general, a K value of 12–30, preferably 15–20, measured in accordance with the method of H. Fikentscher (see "Cellulosechemie" [Cellulose Chemistry] 13, 58 [1932]). After the polymerization, the largest portion of the solvent is distilled off. The still warm solution of copolymer II concentrated accordingly is mixed with such an amount of ammonia or volatile organic base that, during the later dilution with water, a stable solution or dispersion is produced. For this purpose, it is necessary to neutralize about one-third of the carboxyl groups contained in the copolymer II. Suitable organic bases are, in particular, organic amines volatile at baking temperatures of about 170° C., such as, for instance, trialkylamines which are optionally still further substituted, such as, for example, dimethylethanolamine.

The copolymer II, partially present in the form of the ammonium or amine salt thereof, is mixed with the phenolic resin I in customary mixing mechanisms under agitation, proceeding in such a manner that 50–90, preferably 65–80 percent by weight of the copolymer II is combined with 10–50, preferably 20–35 percent by weight of the phenolic resin I (in each case based on the solids content).

In order to prepare the suspension of the present invention, the aluminum is preferably dispersed, as a water-dispersible aluminum paste in petroleum hydrocarbons, in the aqueous, neutralized synthetic resin mixture. In order to stabilize this dispersion, it is possible to add, furthermore, higher alcohols, such as, for example, isotridecyl alcohol. Coatings satisfactorily deposited by this electrocoating process are obtained by providing, in the suspension, an aluminum-synthetic resin ratio of 15–25 percent by weight of aluminum to 75–85 percent by weight of synthetic resin mixture of components I and II.

The thus-prepared suspension is diluted, for purposes of electrodeposition, with fully desalted water to a solids content of 8–16 percent by weight, optionally, other customary additives can be admixed thereto, such as phenolic resins, maleate alkyd resins, maleate oils, pigments, defrothers, flow agents, stabilizers and antioxidants.

In order to produce the coatings, the metallic part to be coated, for example an iron sheet of any desired shape, is dipped into the diluted suspension and connected as the anode. The deposition takes place generally at a voltage of between 50 and 200 volts. After a few minutes, preferably about 1–2 minutes, a uniform coating has been formed on the metallic part, which coating, after rinsing with water, is baked into the part.

The coatings produced in accordance with the present invention are baked coatings. They are hardened at temperatures of between 120 and 200° C. and baking times of between 60 minutes and 20 minutes are used. Preferably, the curing step is performed at 170° C. during a baking time of 30 minutes.

It is also possible to produce coatings which are air-drying or which can be cured in an accelerated manner at temperatures of up to 120° C., if cyclized rubber is incorporated by dispersion into the aluminum suspension. It was found that maximum results are obtained with the use of 70–40 percent by weight of cyclized rubber with 30–60 percent by weight of the synthetic resin mixture of component I and component II (based on the solid resin). A cyclized rubber found particularly useful in the present invention Alpex J450 of Reichhold-Albert-Chemie A.G. The cyclized rubber is preferably in the form of horn-like pellets having a specific gravity of about 0.97–1.02, preferably 1.00 measured at 20° C., a melting point of about 135–150° C. as determined by the capillary method of DIN (German Industrial Standard) 53,181 and a viscosity of about 700–1050 second running time as measured in a viscosimeter at 50 percent solution of analytical benzene according to DIN 53,211. The cyclized rubber is preferably dissolved in organic solvents such as benzene, turpentine, toluene, xylene or trichlorethylene at a preferred concentration of 50–70 percent by weight and an acceptable concentration of 40–80 percent.

The coatings produced according to this invention are smooth, exhibit great hardness, and have a high luster. Also the corrosion resistance is excellent. Thus, coated metallic sheets wherein the coating was baked for 30 minutes at 170° C., showed signs of attack in the salt-spray test according to ASTM B 117–57 T only after 240 hours.

Without further elaboration, it is believed that one skilled in the art can, using the preceding description, utilize the present invention to its fullest extent.

The parts and percentages set forth in the examples are parts by weight and percents by weight.

EXAMPLE 1

(A) Preparation of Phenolic Resin Component I (Condensate A)

200 parts of 2,2-bis(p-hydroxyphenyl)propane
132 parts of 40 percent strength formaldehyde, and
19.65 parts of dimethylethanolamine are agitated at 70° C. for 2 hours, thus obtaining a yellowish solution having a solids content of 70 percent.

(B) Preparation of a Binder Mixture from a Copolymer and Condensate A, within 2 hours, a solution of 322 parts of isobutyl acrylate
53.6 parts of methyl methacrylate
53.6 parts of isomerized linseed oil having a diene number of about 25, determined according to Kaufmann and Baldes
53.6 parts of acrylamide
53.6 parts of acrylic acid
5.36 parts of azobisisobutyronitrile
10.72 parts of di-tert.butyl peroxide in 134 parts of isopropanol is added to 132 parts of boiling isopropanol, the mixture being continuously refluxed. After another 2 hours, the solids content is examined. If 65 percent solids content has not yet been attained, 2.68 parts of azobisisobutyronitrile, made into a slurry with 12 parts of isopropanol, is added to the reaction mixture, and the latter is refluxed for another 4 hours. Once a solids content of 65 percent has been obtained, the charge is polymerized. About 195 parts of solvent is distilled off, toward the end optionally under a slight vacuum. At a final solids content of 85 percent and after cooling to 60–70° C., 24.4 parts of dimethylethanolamine is stirred into the reaction mixture, and 330 parts of condensate A is admixed thereto. The final solids content is 80 percent.

(C) Production of the Coating. Four parts of dimethylethanolamine is added to 375 parts of the 80 percent binder mixture B, and 60 parts of an aluminum paste in petroleum ether with 65 percent aluminum content is uniformly stirred into the reaction mixture. Thereafter, 45 parts of isodecyl alcohol is added thereto.

For purposes of electrodeposition, the mixture is diluted to a solids content of 12 percent by means of deionized water. The pH is 7.8±0.2. The conductance is 1000 myS cm.$^{-1}$± 200, wherein myS means Micro Siemens.

On a deep-drawing quality metal sheet of a size of 10×10 cm.$^2$, connected as the anode, a coating is deposited at a deposition voltage of 100±30 volts and a duration of the deposition step of 2 minutes. The bath temperature is 25° C.±5° C. The coating is baked, after having been rinsed with water, for 30 minutes at 170° C. A hard, grip-proof [not tacky when handled] coating with a metallic luster is obtained which, in a salt-spray test according to ASTM B 117–57 showed no signs of deterioration after 240 hours.

What is claimed is:

1. Film-forming aqueous binder compositions adapted for the production of aluminum coatings on metal substrates by electrodepositing comprising said film-forming aqueous binder composition and sufficient water-soluble amino compounds to impart anionic polyelectrolyte behavior consisting essentially of
   (I) about 10–50 percent by weight of a non-heat reactive phenol-aldehyde resole resin;
   (II) about 50–90 percent by weight of a copolymer, said copolymer comprising:
      (A) about 50–85 percent by weight of an ester of methacrylic acid or acrylic acid with an alcohol having 1–10 carbon atoms;
      (B) about 5–20 percent by weight of drying oils or drying oil fatty acids containing olefinically unsaturated fatty acids;
      (C) about 5–15 percent by weight of an $\alpha,\beta$-olefinically unsaturated carboxylic acid having 3–5 carbon atoms; and
      (D) about 3–20 percent by weight of methacrylamide, acrylamide, methylol methacrylamide, methylol acrylamide, an ether of methylol methacrylamide with an alcohol having 1–8 carbon atoms, an ether of methylol acrylamide having 1–8 carbon atoms or a mixture thereof; and
   (E) about 15–25 percent by weight of aluminum powder with a particle size of 10–75 microns based upon the sum of the weights of I and II.

2. The compositions of claim 1, further comprising in said copolymer 0.1 to 20 percent by weight of copolymerizable olefinically unsaturated vinyl compounds having 1 to 7 carbon atoms.

3. The composition of claim 1, wherein said aluminum powder is about 15 to 25 weight percent and the resin mixture of I and II is about 75 to 85 weight percent.

4. The composition of claim 1, wherein said aluminum powder and said components I and II have a solids content of about 8 to 16 percent dispersed in water.

5. The composition of claim 1, wherein said copolymer comprises:
   50–70 percent by weight of A,
   7–15 percent by weight of B,
   5–15 percent by weight of C, and
   5–15 percent by weight of D.

6. The composition of claim 1, wherein said copolymer comprises:
   60–70 percent by weight of n-butyl acrylate as component A,
   7–15 percent by weight of isomerized linseed oil having a diene number of 20–30 as component B,
   7–12 percent by weight of acrylic acid as component C, and
   5–15 percent by weight of acrylamide as component D.

7. The composition of claim 1, wherein said copolymer comprises:
   50–60 percent by weight of butyl acrylate and 10–20 percent by weight of methyl methacrylate as component A,
   7–15 percent by weight of distilled tall oil as component B,
   7–12 percent by weight of acrylic acid as component C, and
   5–15 percent by weight of methacrylamide as component D.

References Cited
UNITED STATES PATENTS

| | | | |
|---|---|---|---|
| 2,962,460 | 11/1960 | Chapin | 260—19 UA |
| 2,861,048 | 11/1958 | Wright et al. | 260—19 A |
| 3,632,844 | 1/1972 | Robins | 260—19 A |

OTHER REFERENCES

"Kirk Othmer:" Encyclopedia of Chemical Technology, 1968, pp. 546–547.

DONALD E. CZAJA, Primary Examiner

W. E. PARKER, Assistant Examiner

U.S. Cl. X.R.

260—4, 29.3